United States Patent
Ho et al.

(10) Patent No.: US 10,291,053 B1
(45) Date of Patent: May 14, 2019

(54) ADAPTIVE CC-CV TRANSITION CIRCUIT AND POWER MANAGEMENT METHOD

(71) Applicant: Miot Limited, Shatin, Hong Kong (CN)

(72) Inventors: Ka Wai Ho, Hong Kong (CN); King Man Lai, Hong Kong (CN); Chiu Sing Celement Tse, Hong Kong (CN)

(73) Assignee: Miot Limited, Shatin, Hong Kong, SAR (CN)

( * ) Notice: Subject to any disclaimer, the term of this patent is extended or adjusted under 35 U.S.C. 154(b) by 0 days.

(21) Appl. No.: 16/105,633

(22) Filed: Aug. 20, 2018

(51) Int. Cl.
*H02J 7/10* (2006.01)
*H02J 7/00* (2006.01)

(52) U.S. Cl.
CPC .......... *H02J 7/0083* (2013.01); *H02J 7/0081* (2013.01)

(58) Field of Classification Search
CPC ........................................ H02J 7/007–7/0083
USPC .................................. 320/107–115; 330/285
See application file for complete search history.

(56) References Cited

U.S. PATENT DOCUMENTS

| | | | | | |
|---|---|---|---|---|---|
| 5,023,541 | A | * | 6/1991 | Yosinski | G05F 1/563 323/275 |
| 6,124,700 | A | * | 9/2000 | Nagai | H02J 7/0052 320/130 |
| 9,906,121 | B2 | * | 2/2018 | Boncato | H02M 3/156 |
| 2009/0058377 | A1 | * | 3/2009 | Ting | H02J 7/0052 323/234 |
| 2015/0288197 | A1 | * | 10/2015 | Choi | H02J 7/0021 320/107 |

* cited by examiner

*Primary Examiner* — Kyle J Moody
*Assistant Examiner* — Peter M Novak
(74) *Attorney, Agent, or Firm* — Alix, Yale & Ristas, LLP

(57) ABSTRACT

An adaptive constant current-constant voltage (CC-CV) transition circuit comprises an amplifier, a series-pass device with current sense, a feedback network and a constant current controller to provide a stable and smooth transition between a constant voltage mode and a constant current mode, and vice versa. A voltage regulator loop comprises an amplifier, an optional buffer, a series-pass device with current sense and a feedback network which provides a feedback voltage to the amplifier. A current regulation loop comprises the amplifier, the optional buffer, the series-pass device, the feedback network and a constant current controller comprising a trans-impedence amplifier and a transconductance comparator which generate a current signal to a pseudo-constant bias (PCB) and a voltage signal to the adaptive compensation network (ACN) of the amplifier.

20 Claims, 6 Drawing Sheets

ADAPTIVE CC-CV TRANSITION CIRCUIT AND POWER MANAGEMENT METHOD

BACKGROUND

This disclosure relates to devices and methods for regulating constant current and constant voltage. More particularly, this disclosure relates to methods and devices for automatically transitioning between a constant voltage and a constant current mode.

INTRODUCTION

For a power management unit (PMU), constant voltage (CV) and constant current (CC) methods are employed in order to keep the output load from being damaged by over voltage, over current and over power. At the same time, the PMU can be guaranteed to function within its safety operation area. CV mode means that the output voltage of the PMU is kept constant under output load variation, given that output current is less than a pre-defined current threshold. CC mode means that the output current of the PMU is kept constant under output load variation, given that output voltage is less than a pre-defined voltage threshold. It is noted that a PMU is either in CV mode or CC mode during its steady state operation.

Consider an over current scenario, and assume that output of a PMU is shorted to ground while the PMU is in CV mode, the output current increases as the PMU is targeted to maintain a constant voltage. When the output current researches a pre-defined current threshold, CC mode is activated. It takes over the control from CV mode and hence output current is regulated to a target current level. When the output short circuit is removed, output voltage ramps up as the excess current flows to the output node. At the time output voltage is higher than the pre-defined voltage reference, CV mode is activated, it takes over the control from CC mode and hence output voltage is then regulated to the target voltage level again. Without CC mode, an uncontrollable large current will pass through the PMU and the load when a short circuit event occurs, which causes a thermal issue or damage to the PMU and routing traces. There are various methods to implement CV mode and CC mode controllers for a PMU, yet the handover between CV mode and CC mode is seldom discussed.

This disclosure addresses the CV-CC and CC-CV modes handover issue and proposes an architecture that has two distinct features regarding the handover issue. First, the handover transition speed and stability are optimized through an adaptive compensation scheme. Second, an amplifier is re-used for both CV and CC modes, which is biased by a unique biasing scheme that also favors handover transition while at the same time, saving silicon area and power consumption. Transistor level implementation is proposed as an example to realize the said architecture.

SUMMARY

This disclosure presents an architecture that features stable and smooth transition between constant voltage and constant current modes and vice versa. System level and transistor level are presented with simulation results as verification.

A linear regulator comprises an amplifier $A_0$ having a first and second input and an output. The first input connects to $V_{FB}$, the second input connects to $V_{REF}$. The amplifier has a pseudo-constant bias (PCB) which, in a CV mode, automatically biases and controls the transconductance to amplifier $A_0$ as a function of the operating mode. The amplifier $A_0$ also has an adaptive compensation network (ACN) which adaptively alters speed and stability for current regulation in a CC mode. A series-pass device responsive to the amplifier $A_0$ output and to $VDD_2$ has an $I_{OUT}$ output and an $I_{SEN}$ output. The series-pass device controls the current from $VDD_2$ to $I_{OUT}$ and $I_{SEN}$. A feedback network has two inputs which sense voltage differentials between $V_{OUT}$ and GND and generates an output $V_{FB}$ to amplifier $A_0$. A CC controller has a trans-impedance amplifier $Z_1$ and a transconductance device $Gm_1$. The CC controller receives a first input $I_{SEN}$ from the series-pass device and a second input $I_{REF}$. Amplifier $Z_1$ compares $I_{SEN}$ and $I_{REF}$ and generates $V_{SEL}$ as voltage for a signal to the ACN for amplifier $A_0$ and device $Gm_1$ generates a current control $I_{SEL}$ to the PCB.

A voltage regulation loop to the amplifier $A_0$ comprises a series-pass device and a feedback network which applies $V_{FB}$ to the amplifier $A_0$ and a current regulation loop comprises the series-pass device, the feedback network and the CC controller which applies an $I_{SEL}$ to the PCB and a $V_{SEL}$ to the ACN.

In one embodiment, a buffer is interposed between the amplifier $A_0$ and the series-pass device. A compensation capacitor $C_C$ is disposed in the voltage regulation loop and the current regulation loop. In the CV mode, $V_{OUT}$ is regulated, and $I_{SEN}$ is monitored by amplifier $Z_1$. In the CC mode, $I_{OUT}$ is regulated and $V_{FB}$ is monitored by PCB, and when $V_{FB}$ ramps up and approaches $V_{REF}$, the regulator is triggered to implement a CV to CC mode transition.

When the regulator is in a CV mode, the compensation capacitor $C_C$ is reduced by the ACN to preserve stability. In CC mode, the CC feedback loop dominates and the compensation capacitor $C_C$ is magnified by the ACN for frequency compensation.

In one embodiment, a linear regulator comprises an amplifier $A_0$ having a first input and a second input and an output. The first input connects to $V_{FB}$. The second input connects to $V_{REF}$. The amplifier $A_0$ has a PCB which automatically biases amplifier $A_0$ as a function of the operating mode and has an ACN which adaptively alters speed and stability for current regulation during a CC mode. A buffer connects to the amplifier $A_0$ output and generates a buffer output. A series-pass device is connected to the buffer output and to $VDD_2$. The series-pass device has an $I_{OUT}$ output and an $I_{SEN}$ output. The series-pass device controls the current flowing from $VDD_2$ to $I_{OUT}$ and $I_{SEN}$. The feedback network has two input voltage which sense differential between $V_{OUT}$ and ground and generates an output voltage feed $V_{FB}$ to amplifier $A_0$. A CC controller has a transconductance device $G_{M1}$ and has a trans-impedance amplifier $Z_1$. The controller has a first input $I_{SEN}$ from the series-pass device and a second input $I_{REF}$. The amplifier $Z_1$ compares $I_{SEN}$ and $I_{REF}$, and generates $V_{SEL}$ as a voltage for a signal to the ACN and amplifier $A_0$. Device $G_{M1}$ generates a current control $I_{SEL}$ to the PCB.

The series-pass device has a current sensor. The series-pass device may comprise a p-channel MOSFET, an n-channel MOSFET or a bipolar junction transistor.

A CV feedback loop to amplifier $A_0$ operates in a CV mode and a CC feedback loop to the amplifier $A_0$ operates in a CC mode.

A compensation capacitor is disposed in the CV feedback loop and the CC feedback loop. When the regulator is in a CV mode, the compensation capacitor is reduced by ACN to preserve the stability and in a CC mode, the CC feedback loop dominates and the compensation capacitor is magnified by the ACN for frequency compensation.

In the CV mode, $V_{OUT}$ is regulated and $I_{SEN}$ is monitored by amplifier $Z_1$. When the $I_{SEN}$ is larger than $I_{REF}$, the regulator undergoes a CV to CC mode transition.

A power management method for managing CV-CC and CC-CV transition mode in a circuit comprises controlling a CV mode of operation by a first bias to an amplifier to control transconductance $Gm_0$ in the amplifier so that the amplifier has a gain of $Gm_0 * R_0$ to amplify the difference between $V_{FB}$ and $V_{REF}$ wherein a CV feedback loop keeps a $V_{OUT}$ to a desired level, and controlling a CC mode of operation by a second bias to the amplifier so that for a second transconductance $Gm_1$ the amplifier provides a gain $Gm_1 * R_0$ to amplify the difference between $I_{SEN}$ and $I_{REF}$ wherein a CC feedback loop provides $I_{OUT}$ at a desired level.

The power management method further comprises operating the amplifier in a high gain region in CV and CC modes.

The power management method may also comprise activating a compensation network to the band width for the CC mode and disabling the compensation network in the CV mode.

The power management method may further comprise in the CV mode regulating the $V_{OUT}$ and monitoring the $I_{OUT}$ through the $I_{SEN}$ by an amplifier $Z_1$ such that when $I_{SEN} > I_{REF}$, the CV mode transitions to a CC mode.

The power management method may also comprise regulating the $I_{OUT}$ and monitoring the $V_{FB}$ so that when the $V_{FB}$ ramps up and approaches $V_{REF}$, the CC mode transitions to the CV mode.

DETAILED DESCRIPTION

Figure 1:
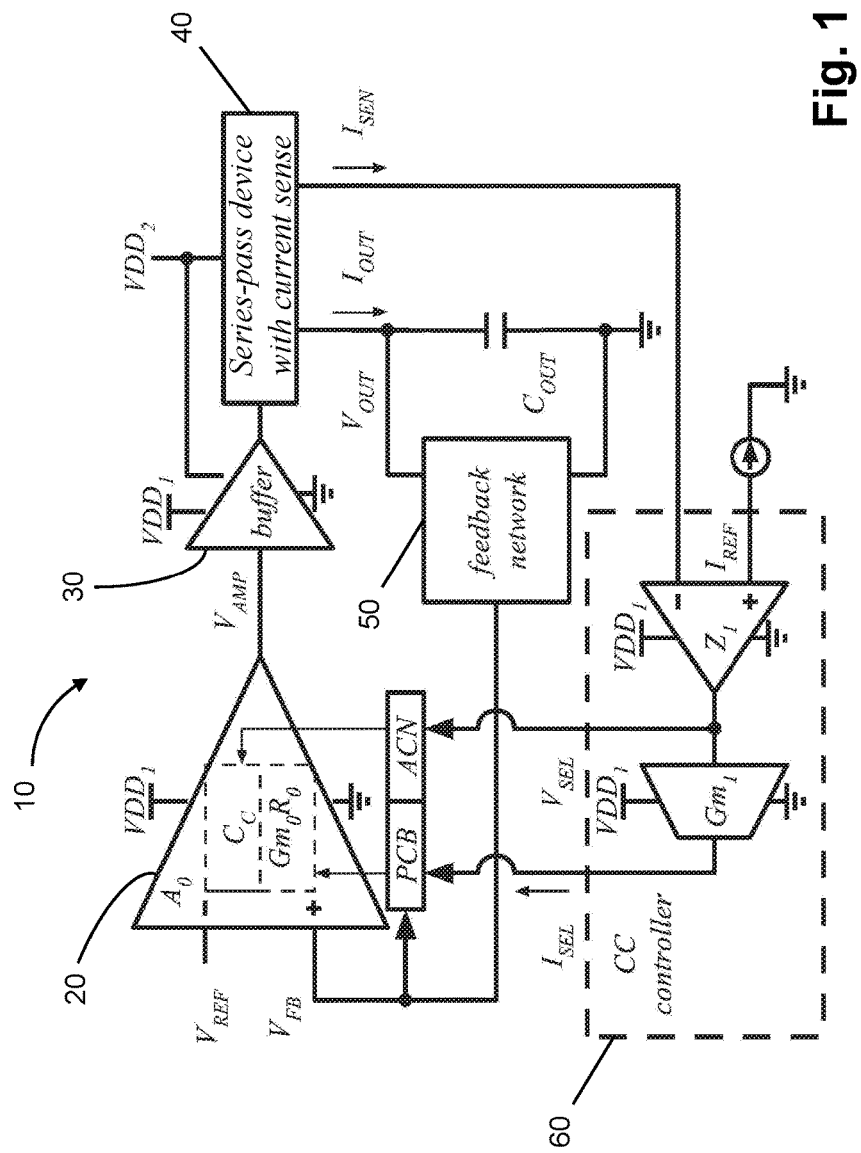
FIG. 1 is a schematic circuit diagram of a linear regulator.

The proposed architecture is demonstrated by a linear regulator 10 as shown in FIG. 1. It illustrates a generalized case wherein the architecture can be supplied by a single supply, where $VDD_1$ equals to $VDD_2$, or two different supply voltages, $VDD_1$ and $VDD_2$, depending on the system requirement. $V_{OUT}$ is the regulated output voltage, $C_{OUT}$ is the output's decoupling capacitor and output load is connected in parallel with $C_{OUT}$. All the node voltages are referred to ground GND in the following discussion.

The architecture comprises five blocks, namely, amplifier $A_0$ 20, buffer 30, series-pass device with current sense 40, feedback network 50 and CC controller 60. The first block is an amplifier, $A_0$ 20, which has two input terminals and one output terminal. One of the inputs is a non-inverting input that connects to feedback voltage, $V_{FB}$, which is generated by feedback network. The other input is an inverting input that connects to reference voltage, $V_{REF}$, from reference generator, which is not shown in the figure. The output of the amplifier 20 is connected to a buffer 30. The said amplifier has two special features, Pseudo-Constant Bias (PCB) and Adaptive Compensation Network (ACN). PCB automatically biases the amplifier 20 and hence controls transconductance of the amplifier, $Gm_0$, depending on the operating mode of the linear regulator. ACN adaptively alters speed and stability trade-off for a current regulation loop during the CC mode.

The second block is a buffer 30 that has one input connecting to the output of amplifier, $A_0$, and its output connecting to series-pass device 40. The main purpose is to pass the signal at the output of amplifier $A_0$ to the input of series-pass device 40 without degradation. It isolates capacitive load seen by amplifier $A_0$ from the series-pass device and enhances driving capability of amplifier $A_0$. Buffer 30 acts as a level translator in case $VDD_1$ and $VDD_2$ have a different potential. The buffer is optional depending upon system requirement. It can be bypassed with the amplifier $A_0$ output directly connecting to the input of series-pass device. It is assumed that the buffer has unity gain in the following discussion.

The third block is a series-pass device with current sense. It has two inputs; one connects to the buffer output and another one connects to supply voltage, $VDD_2$. Series-pass device 40 has two outputs, $I_{OUT}$ and $I_{SEN}$, flowing current output from the block. The series-pass device controls the current flowing from $VDD_2$ to $I_{OUT}$ and $I_{SEN}$, biased on the voltage or current signal from the buffer. The series-pass device 40 can be implemented by a p-channel or n-channel MOSFET or bipolar junction transistor. For MOSFET implementation, the output voltage signal from the buffer is used to alter the amount of current flow through the MOSFET from $VDD_2$. For bipolar junction transistor implementation, the output current signal from the buffer is used to alter the amount of current through the transistor from $VDD_2$. The total current through the series-pass device 40 equals to the sum of $I_{OUT}$ and $I_{SEN}$, wherein $I_{OUT}$ is supplied to the output load and feedback network, and whereas $I_{SEN}$ is a tracked, scaled down version of $I_{OUT}$ for modes detection. There are various ways to realize $I_{SEN}$ in the transistor level.

The forth block is feedback network 50 which has of two inputs and one output. The two inputs sense the differential voltage between output voltage, $V_{OUT}$, and ground, as demonstrated in FIG. 1. The output of feedback network 50, $V_{FB}$, is a scaled down version of the said differential voltage, which can have different scaling factor based on the voltage signal's frequency range.

The fifth block is CC controller 60 which has a transimpedance amplifier, $Z_1$, and a transconductance amplifier, $G_{MI}$. The CC controller takes two input current signals, $I_{SEN}$ from series-pass device with current sense and reference current signal, $I_{REF}$. $Z_1$ compares $I_{SEN}$ and $I_{REF}$, and then generates a voltage signal, $V_{SEL}$, which is a voltage control signal for ACN in $A_0$. $V_{SEL}$ is further transformed to current control signal, $I_{SEL}$, for the PCB in $A_0$.

Working Principle

Figure 2:
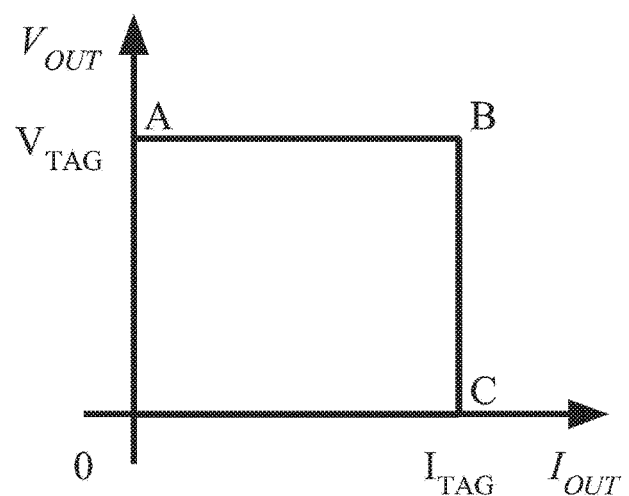
FIG. 2 is a graphical representation of the operating mode for the linear regulator of FIG. 1.

The proposed architecture in FIG. 1 operates in two modes, namely CV mode and CC mode, depending on loading condition, $V_{OUT}$ and $I_{OUT}$. The operating mode is illustrated in FIG. 2. The y-axis represents output voltage of a linear regulator, $V_{OUT}$, whereas the x-axis represents output current, $I_{OUT}$. Consider a regulator is set to maintain $V_{OUT}$ to be $V_{TAG}$ with a maximum output current of $I_{TAG}$. The regulator operates along the lines AB in CV mode, where a voltage regulation loop is dominated. It delivers current to the output load in order to keep $V_{OUT}$ equal to $V_{TAG}$. When $I_{OUT}$ equals to $I_{TAG}$, CC mode is activated, and a current regulation loop is introduced that overpowers the voltage regulation loop in order to keep $I_{OUT}$ equal to $I_{TAG}$. Therefore, the regulator operates along line BC and $V_{OUT}$ drops. When current requested by the load decreases, the regulator's operating point moves back from C to B as $V_{OUT}$ increases. At the time $V_{OUT}$ equals to $V_{TAG}$, the current regulation loop passes the control to the voltage regulation loop and hence back to CV mode. There is a mode transition or handover from CV to CC mode and from CC to CV mode around point B.

Voltage Regulation Loop

Figure 3:
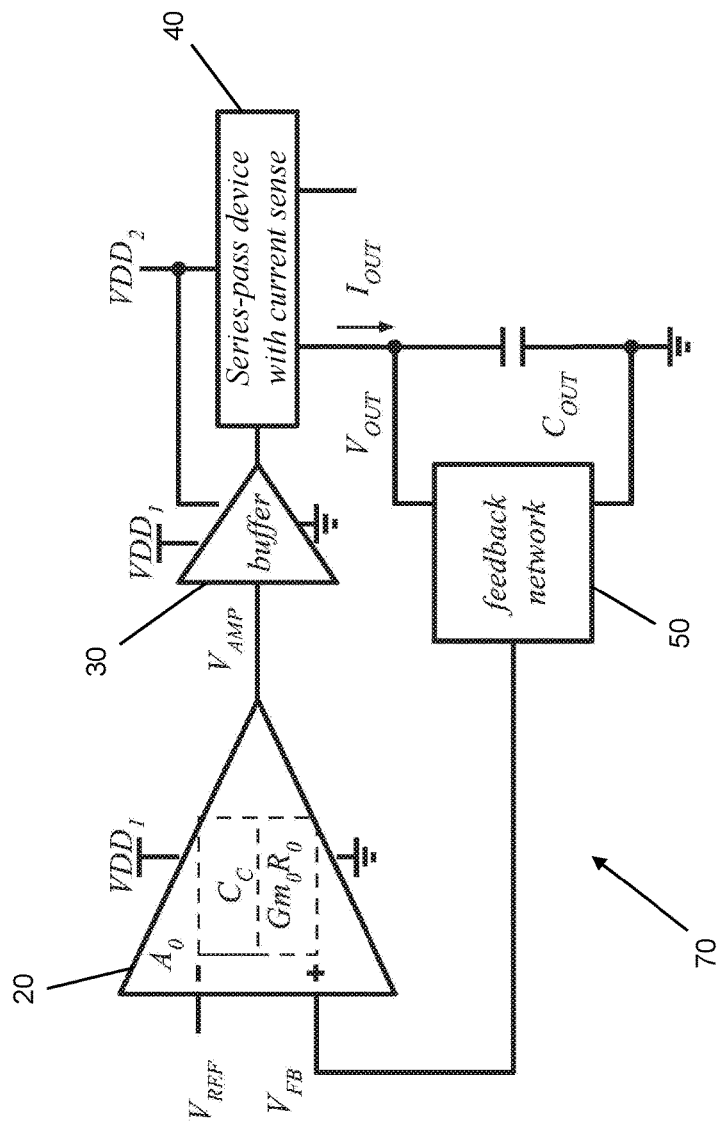
FIG. 3 is a schematic diagram of a voltage regulator loop for the linear regulator of FIG. 1.

For the proposed architecture, the voltage regulation loop 70 comprises amplifier $A_0$ 20, buffer 30, series-pass device with current sense 40 and feedback network 50, forming a negative feedback loop as shown in FIG. 3. The objective of the voltage regulation loop 70 is to maintain $V_{FB}$ to be equal to $V_{REF}$, since $V_{FB}$ is a scaled-down version of $V_{OUT}$, $V_{OUT}$ is regulated to be approximately $$V_{OUT} = \left\{ \frac{Gm_0 \times R_0 \times Gm_{pass} \times R_{OUT}}{1 + \beta \times Gm_0 \times R_0 \times Gm_{pass} \times R_{OUT}} \right\} \times V_{REF} \qquad (1)$$

where $Gm_0$ and $R_0$ are the transconductance and output impedance of $A_0$ respectively, $Gm_{pass}$ is the transconductance of series-pass device, $R_{OUT}$ is impedance of output load and $\beta$ is the scaling factor of feedback network. Consider an increase of $I_{OUT}$, $V_{OUT}$ drops and hence $V_{FB}$ drops to be less than $V_{REF}$. $A_0$ amplifies the error ($V_{FB}-V_{REF}$) to be $V_{AMP}$ with a gain of $Gm_0*R_0$. $V_{AMP}$ is given by equation (2).

$$V_{AMP} = Gm_0 \times R_0 \times (V_{FB} - V_{REF}) \qquad (2)$$

As a result, the series-pass device allows more current to flow from $VDD_2$ to $V_{OUT}$, which compensates for the increase of $I_{OUT}$. Therefore, $V_{OUT}$ restores to the targeted value as in equation (1). With a negative feedback loop, frequency compensation is required to ensure loop stability. As suggested in FIG. 3, a capacitor, $C_{OUT}$, is placed at the output of the linear regulator. It introduces a low frequency pole as dominant pole and hence stabilizes the negative feedback loop.

Current Regulation Loop

Figure 4:
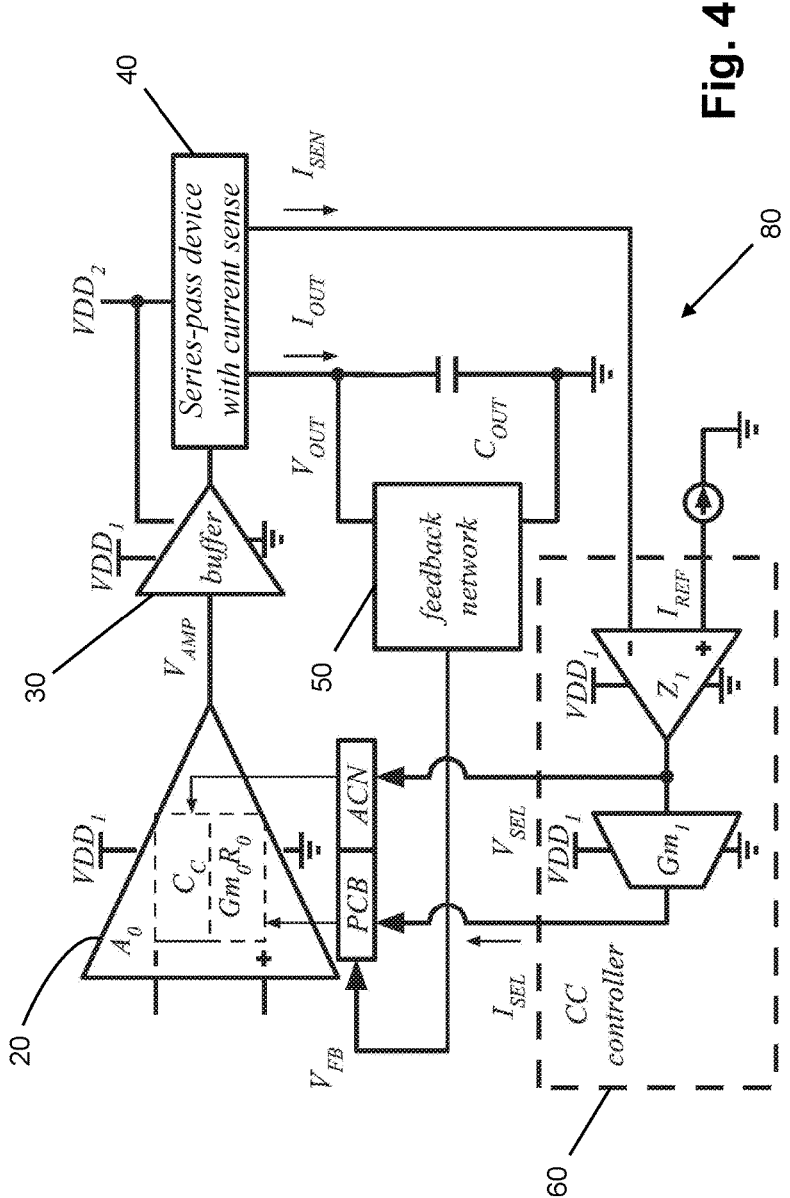
FIG. 4 is a schematic diagram of a current regulation loop for the linear regulator of FIG. 1.

The current regulation loop 80 comprises amplifier $A_0$ 20, buffer 30, series-pass device 40 and CC controller 60, forming another negative feedback loop as shown in FIG. 4. The objective of the current regulation loop 80 is to maintain $I_{SEN}$ to be equal to $I_{REF}$, since $I_{SEN}$ is a scaled-down version of $I_{OUT}$, $I_{OUT}$ is regulated to be approximately $$I_{OUT} = \left\{ \frac{Z_1 \times Gm_1 \times R_0 \times Gm_{pass} \times R_{OUT}}{1 + M \times Z_1 \times Gm_1 \times R_0 \times Gm_{pass} \times R_{OUT}} \right\} \times I_{REF} \qquad (3)$$

where $Z_1$ and $Gm_1$ is the trans-impedance gain and the transconductance gain of CC controller respectively, $R_0$ is output impedance of $A_0$, $Gm_{pass}$ is transconductance of series-pass device and M is the scaling ratio $I_{OUT}$ to $I_{SEN}$. Consider an increase of $I_{OUT}$, $I_{SEN}$ also increases as it is a scaled-down version of $I_{OUT}$. $I_{OUT}$ is then compared with $I_{SEN}$ and the difference is converted to voltage signal, $V_{SEL}$, by $Z_1$. After that, $V_{SEL}$ is transformed to a current signal, $I_{SEN}$ by $Gm_1$ inside CC controller. $I_{SEN}$ is further amplified by output impedance of $A_0$ to $V_{AMP}$ through PCB and $R_0$. $V_{AMP}$ is given by equation (4).

$$V_{AMP} = Gm_1 \times R_0 \times Z_1 \times (I_{REF} - I_{SEN}) \qquad (4)$$

It is noted that the output impedance stage of $A_0$, $R_0$, is re-used in current regulation loop. $V_{AMP}$ controls the input of the series-pass device and allows less current to pass through. Finally, $I_{OUT}$ restores to a targeted value as in equation (3). From a loop stability concern, $C_{OUT}$ does not help stabilizing the loop as $V_{OUT}$ is not used in the current regulation loop. Therefore, a compensation capacitor, $C_C$, is added for frequency compensation. Since $C_C$ is also located inside the voltage regulation loop, it also affects frequency compensation of voltage regulation loop. Here, ACN is introduced to alleviate the stated concern. It adaptively adjusts the value of $C_C$ base on the operating mode. When the regulator is in CV mode, the voltage regulation loop dominates and then $C_C$ is reduced by ACN to minimize effect on voltage regulation loop's stability. On the other hand, when the regulator is in CC mode, and current regulation loop dominates, the $C_C$ is then magnified by ACN and acts as the dominant role for frequency compensation.

CV-CC Mode Transition

Since there are two different modes for the regulator with two different loops that control $V_{OUT}$ and $I_{OUT}$ independently, while sharing same circuit blocks and resources, the mode transition and loop settling issues must be resolved. The mode transition issue refers to criteria or condition to switch from CV mode to CC mode and vice versa. The loop settling issue refers to how to handover from voltage regulation loop in CV mode to current regulation loop in CC mode, such that both loops settle smoothly and bias correctly and vice versa.

When a regulator is working in CV mode, although the CC controller is not involved in voltage regulation, it is neither disabled nor shut down. The CC controller continuously monitors whether $I_{SEN}$ reaches upper bound that is set by $I_{REF}$. Owing to the continuous monitoring, the regulator can detect mode change from CV to CC immediately, that is the instant when $I_{SEN}$ is larger than or equal $I_{REF}$. Under CV mode, $I_{SEN}$ should be less than $I_{REF}$, and $Z_1$ acts as a comparator with a high bandwidth. $V_{SEL}$ behaves as a digital signal, which is bounded by $VDD_1$ and GND, and disables the ACN. $I_{SEL}$ also behaves as a digital signal, which prevents PCB from changing $Gm_0$ of $A_0$. Hence, $A_0$ functions as an amplifier that amplifies the error $V_{FB}-V_{REF}$ for voltage regulation with a gain $Gm_0*R_0$. The output, $V_{AMP}$, controls the amount of current flow through the series-pass device. When $I_{OUT}$ is gradually increased due to load variation, $I_{SEN}$ is also increased and approaches $I_{REF}$. At the time $I_{SEN}$ is larger than or equal to $I_{REF}$, both $V_{SEL}$ and $I_{SEL}$ flip their state owing to the impedance gain, $Z_1$ and transconductance gain $Gm_1$. The regulator is changed from CV mode to CC mode, and both ACN and PCB are activated. It is noted that both $V_{SEL}$ and $I_{SEL}$ behave as an analog signal and contain the error term, $I_{REF}-I_{SEN}$, as shown in equations (5) and (6).

$$V_{SEL} = Z_1 \times (I_{REF} - I_{SEN}) \qquad (5)$$

$$I_{SEL} = Gm_1 \times Z_1 \times (I_{REF} - I_{SEN}) \qquad (6)$$

The error term, $I_{REF}-I_{SEN}$, is used to regulate $I_{SEN}$ and hence current goes into the load, $I_{OUT}$. Since ACN is activated, the compensation capacitor, $C_C$, is magnified and used to compensate the current regulation loop for better stability. PCB is also enabled which degenerates the transconductance $Gm_0$ used in voltage regulation loop. In addition, output impedance, $R_0$, from $A_0$ is re-used to amplify and convert $I_{SEL}$ to $V_{AMP}$. Therefore, $V_{AMP}$ adjusts current passing through the series-pass device for current regulation. The overall gain for the current regulation loop is given by equation (7).

$$\text{Gain} = Gm_1 \times R_0 \times Z_1 \quad (7)$$

CC-CV Mode Transition

From the CV-CC mode transition, it is observed that the transition is triggered by an over current event, that is, $I_{SEN}$ is larger than or equal to $I_{REF}$. After the transition, the voltage regulation loop is suppressed and the regulator is dominated by the current regulation loop, such that the regulator outputs a regulated current, $I_{OUT}$.

Consider another case when a regulator is working in the CC mode, although amplifier, $A_0$, does not amplify the voltage error, $V_{FB} - V_{REF}$, it is neither disabled nor shutdown. Owing to the unique bias scheme by PCB, $Gm_0$ is degenerated and output impedance, $R_0$, is re-used to amplify $I_{SEL}$. The current regulation loop is stabilized by $C_C$ owing to ACN. Under CC mode, $V_{FB}$ should be less than $V_{REF}$ as the sourcing current by the output load is larger than the sinking current provided by the series-pass device. With the help of the PCB, the large difference between $V_{FB}$ and $V_{REF}$ does not interfere with $V_{AMP}$, and $A_0$ is not saturated nor distorted; instead it is maintained in a high gain operating point. When current drawn by the output load is gradually decreased, $V_{OUT}$ increases as excess current is stored in $C_{OUT}$. At the time $V_{FB}$ ramps up and becomes close to $V_{REF}$, the PCB is deactivated, $Gm_0$ is regained while $Gm_1$ is suppressed. As a result, $A_0$ amplifies the voltage difference between $V_{FB}$ and $V_{REF}$, the voltage regulation loop takes over the control of the regulator from the current regulation loop. $I_{OUT}$ gradually decreases since the regulator tries to regulate $V_{OUT}$ to a desired value. As $I_{OUT}$ and hence $I_{SEN}$ decreases, $V_{SEL}$ flips its state and turns off ACN. As a result, $Z_1$ regains its bandwidth and keeps track of $I_{SEN}$ again. At this moment, the regulator is back to CV mode. Unlike CV-CC mode transition, the triggering event is determined by $V_{OUT}$, specifically $V_{FB}$ being larger than $V_{REF}$. Since the mode transitions are based on two different observations, the regulator will not be tripped in a metastable state, where the regulator's state oscillates between the CV-CC mode transition and the CC-CV mode transition.

Features

As noted, the CV and CC modes are commonly employed in power management unit. The foregoing disclosure addresses the mode transition issues and emphasizes the stability and smooth transition. The disclosed architecture improves CV-CC and CC-CV modes transition with the following three distinct features.

1. The Pseudo-Constant Bias (PCB) is a controller that provides proper bias for the amplifier, $A_0$. In CV mode operation, PCB provides a bias such that $Gm_0$ in $A_0$ comes into effect. As a result, $A_0$ has a gain of $Gm_0 * R_0$ to amplify the difference between $V_{FB}$ and $V_{REF}$. The control is then dominated by the voltage regulation loop, keeping $V_{OUT}$ to a desired value. In the CC mode operation, PCB provides another bias condition such that $Gm_0$ in $A_0$ is degenerated. Owing to the unique biasing scheme, output impedance of $A_0$, $R_0$, is re-used with $Gm_1$ in the CC controller. This provides a gain of $Gm_1 * R_0$ to amplify the difference between $I_{SEN}$ and $I_{REF}$ for output current regulation. It is noted that the amplifier, $A_0$, is always operating in high gain region in both the CV and CC modes. This ensures that $A_0$ and hence loop gains for both voltage regulation loop and current regulation loop are high enough to provide a high accuracy control during the CV-CC and CC-CV mode handover. It is recalled that the output of $A_0$, $V_{AMP}$, controls the series-pass device to adjust current pass through in all modes and transitions owing to the sharing of output impedance, $R_0$, by PCB.

2. The Adaptive Compensation Network (ACN) is a controller that adjusts bandwidth and stability for the current regulation loop. In the CV mode, ACN disables the compensation network by $C_C$ and hence extends the bandwidth of the current regulation loop; therefore $Z_1$ acts as a comparator and $V_{SEL}$ behaves as a digital signal. This helps the regulator to keep track of $I_{SEN}$ and responses to over current event immediately. In the CC mode, ACN is activated, and it magnifies the value of $C_C$ and hence limits the bandwidth of the current regulation loop. The ACN guarantees a compensated, stabilized negative feedback loop for current regulation in the CC mode. It is noted that the CV-CC transition has a fast response as it is desired to stop over current at once. On the other hand, the CC-CV transition has a slower response since the CC mode has a limited bandwidth. This allows a smooth transition from current regulation loop to voltage regulation loop without any glitches.

3. The trigger events for the CV-CC mode and CC-CV mode transitions are based on two different observations. As a result, the regulator will not fall into a case that oscillates between the two transitions. Under the CV mode, $V_{OUT}$ is regulated and $I_{SEN}$ is monitored by $Z_1$. When $I_{SEN}$ is larger than $I_{REF}$, the regulator is triggered and undergoes CV-CC mode transition and then enter CC mode. Under CC mode, $I_{OUT}$ is regulated and $V_{FB}$ is monitored by PCB. When $V_{FB}$ ramps up and approaches $V_{REF}$, the regulator is triggered and undergoes the CC-CV mode transition and then enters the CV mode.

Transistor-Level Implementation

Figure 5:
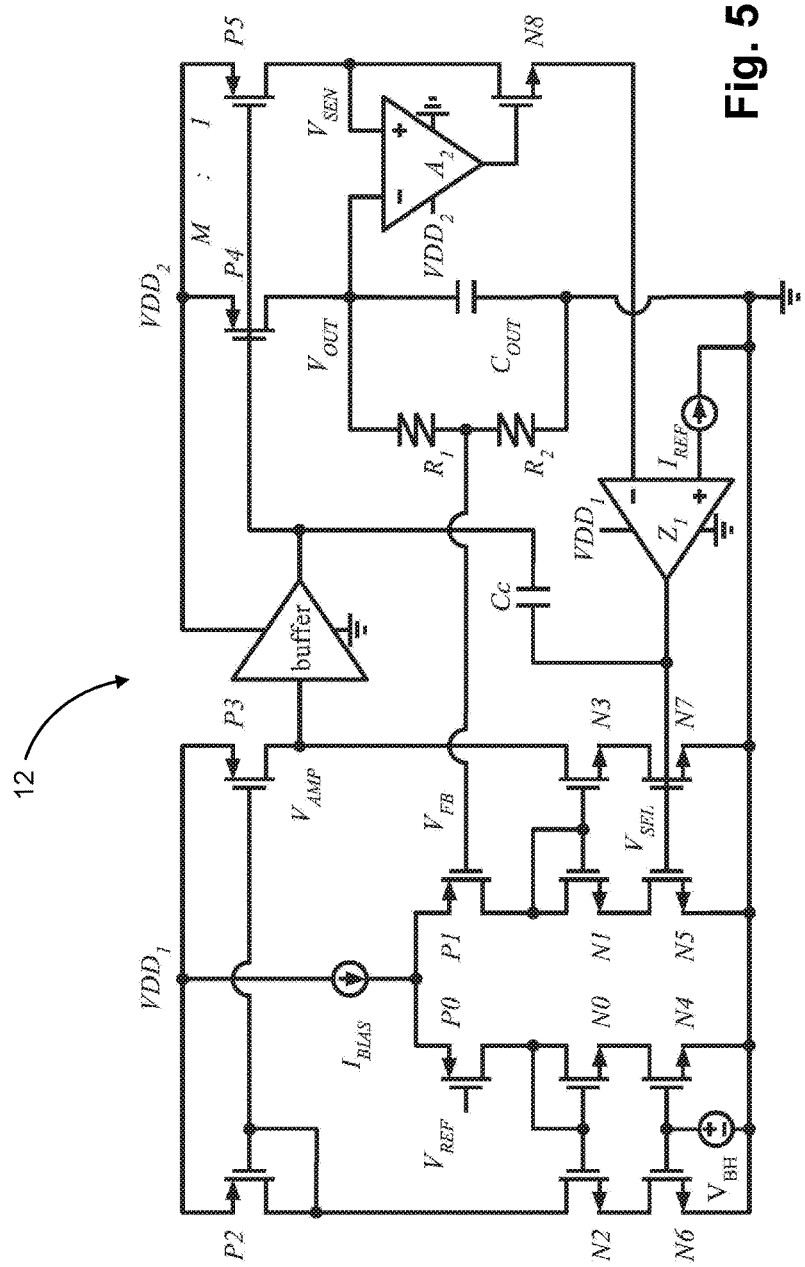
FIG. 5 is a schematic circuit diagram of a transistor-level implementation for a linear regulator.

One embodiment of the transistor-level implementation for the proposed architecture as a linear regulator 12 is shown in FIG. 5. The amplifier, $A_0$, comprises P0, P1, P2, P3, N0, N1, N2 and N3, where $Gm_0$ is the transconductance of P0, P1 pair and $R_0$ is the drain-source impedance of P3 and N3. The buffer is optional depending upon system requirement. The series-pass device with current sense is implemented as a pair of matched PMOS, P4 and P5, with a size ratio of M to 1. The amplifier $A_2$ and N8 form a negative loop to track the drain-source voltages of P4 and P5. Since gate-source and drain-source voltages for P4 and P5 are matched, the drain currents are matched with a ratio of M to 1 and drain current of P5 is equivalent to $I_{SEN}$. The feedback network is formed by a resistive divider, $R_1$ and $R_2$. The CC controller is formed by $Z_1$ and N7, where $Gm_1$ is the transconductance of N7.

The Pseudo-Constant Bias (PCB) is formed by N4, N5, N6, N7 and $V_{BH}$. The objective is to bias transistors in $A_0$ in the CV and CC mode. Gate voltage and hence drain current of N5 and N7 are controlled by $Z_1$. N4, N5 and $V_{BH}$ are employed to reduce systematic offset of $A_0$ due to the introduction of N5 and N7. $V_{BN}$ is a voltage source that matches with voltage level high when $Z_1$ acts a comparator in the CV mode.

Consider the linear regulator 12 in the CV mode wherein $V_{SEL}$ is high level and a large drain current can pass through N5 and N7. However, the drain currents for all transistors in $A_0$ are limited by $I_{BIAS}$ and hence transconductance of N5 and N7 are degenerated. The transconductance from P0, P1 pair is dominant and hence the voltage regulation loop takes over the regulator's control.

Consider the linear regulator 12 in the CC mode. Since source impedance between N1, N3 pair and the N0, N2 are imbalanced, hence transconductance $Gm_0$ from P0, P1 pair is then degenerated. As a result, $Gm_1$ from N7 is dominant and the current regulation loop comes into effect. The output impedance by P3 and N3 amplifies $V_{SEL}$ to $V_{AMP}$ which re-uses the same transistors in $A_0$ for silicon area and power saving. It is noted that P0, P1, P2, N0, N1, N2 and $I_{BIAS}$ couple $V_{SEL}$ to the gate of P3, forming a push-pull output stage. It is also noted that owing to the high loop gain, drain current of P3, N3 are forced to be the same, meaning that four branch currents, with N4, N5, N6 and N7 at the bottom, are forced to be the same. This enforces $A_0$ to stay in high gain region in both the CC and CV mode.

The Adaptive Compensation Network (ACN) comprises N3, N7, P3, buffer (optional) and $C_C$. The objective is to magnify the capacitance $C_C$ in the loop transfer function depending on the operating mode. In the CV mode, the capacitance of $C_C$ is the same as its physical value. In the CC mode, the effective capacitance of $C_C$ is amplified by a gain of $Gm_1 * R_0$ due to the Miller effect. Due to the Miller effect, the current regulation loop is compensated.

Simulation Results

Figure 6:
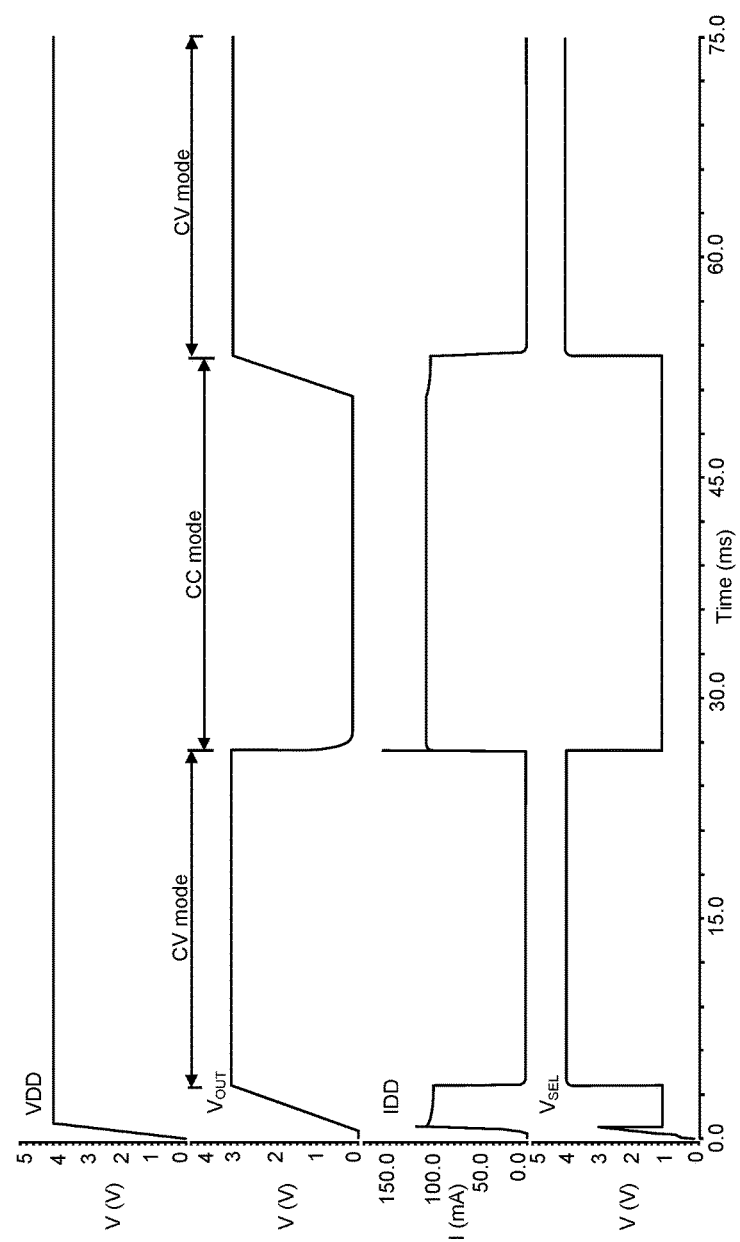
FIG. 6 is a graphical representation of a simulator with an output voltage of 3V and an over current protection of 100 mA for the linear regulator of FIG. 5.

The transistor-level embodiment of linear regulator 12 in FIG. 5 is verified by simulation. A linear regulator with output voltage of 3V and over current protection of 100 mA is designed. FIG. 6 shows the simulation results. VDD is the supply voltage of the regulator, $V_{OUT}$ is the output voltage of the regulator, IDD is the supply current that sinks from VDD. $V_{SEL}$ is the internal node voltage in the CC controller. From time=0 ms to 4 ms, VDD and hence $V_{OUT}$ ramp up. From time=4 ms to 25 ms, $V_{OUT}$ is regulated to the desired value, and the regulator is in CV mode. At time=25 ms, the output is suddenly shorted to ground. IDD is limited to 100 mA and $V_{OUT}$ is discharged. The regulator enters CC mode so that $V_{SEL}$ is set to a low voltage. At time=50 ms, the short circuit load is released, the regulator is still operating in CC mode. From time=50 ms to 54 ms, IDD is held at 100 mA and the excess current is used to charge up output capacitor. When $V_{OUT}$ is close to 3V, the regulator switched back to CV mode and $V_{SEL}$ is pulled high at the same time.

While preferred embodiments of the foregoing have been set forth for purposes of illustration, the foregoing description should not be deemed a limitation of the invention herein. Accordingly, various modifications, adaptations and alternatives may occur to one skilled in the art without departing from the spirit and the scope of the present invention.

The invention claimed is:

1. A linear regulator which implements a constant voltage to constant current (CV-CC) transition and a constant current to constant voltage (CC-CV) transition comprises:
an amplifier $A_0$ having a first and second input and an output, said first input connects to feedback voltage ($V_{FB}$), said second input connects to reference voltage ($V_{REF}$), said amplifier $A_0$ having a pseudo-constant bias (PCB) which automatically biases and controls the transconductance of amplifier $A_0$ as a function of an operating mode and connecting with an adaptive compensation network (ACN) which adaptively alters speed and stability for current regulation;
a series-pass device responsive to said amplifier $A_0$ output and to second supply voltage ($VDD_2$) and having a first output current ($I_{OUT}$) output and having a second output current ($I_{SEN}$) output, said series-pass device controlling the current from $VDD_2$ to $I_{OUT}$ and $I_{SEN}$;
a feedback network having two inputs which sense voltage differential between output voltage ($V_{OUT}$) and ground and generates an output $V_{FB}$ to amplifier $A_0$; and
a constant current (CC) controller having a trans-impedence amplifier $Z_1$ and a transconductance device $Gm_1$ and a first input $I_{SEN}$ from the series-pass device and a second input $I_{REF}$ wherein amplifier $Z_1$ compares $I_{SEN}$ and $I_{REF}$ and generates $V_{SEL}$ as voltage for a signal to ACN for amplifier $A_0$ and device $Gm_1$ generates a current control $I_{SEL}$ to the PCB,
wherein a voltage regulation loop to the amplifier $A_0$ comprises a series-pass device and a feedback network which applies $V_{FB}$ to said amplifier $A_0$ and a current regulation loop comprises the series-pass device, the feedback network and the CC controller which applies an a control current ($I_{SEL}$) to said PCB and a voltage control ($V_{SEL}$) to said ACN.

2. The linear regulator of claim 1 wherein a buffer is interposed between the amplifier $A_0$ and the series-pass device.

3. The linear regulator circuit of claim 1, further comprising a compensation capacitor $C_C$ disposed in the voltage regulation loop and the current regulation loop.

4. The linear regulator of claim 1, wherein in the constant voltage (CV) mode, $V_{OUT}$ is regulated, and $I_{SEN}$ is monitored by amplifier $Z_1$.

5. The linear regulator of claim 1, further comprising a compensation capacitor $C_C$ disposed in the constant voltage (CV) feedback loop and the CC feedback loop and wherein when the regulator is in a CV mode, the compensation capacitor $C_C$ is reduced by ACN to preserve stability and in CC mode, the CC feedback loop dominates and the compensation capacitor $C_C$ is magnified by ACN for frequency compensation.

6. The linear regulator of claim 1 wherein in the CC mode, $I_{OUT}$ is regulated and $V_{FB}$ is monitored by PCB and when $V_{FB}$ ramps up and approaches $V_{REF}$, the regulator is triggered to implement a CC to CV mode transition.

7. The linear regulator of claim 1 wherein $V_{OUT}$ is regulated to be approximately $$V_{OUT} = \left\{ \frac{Gm_0 \times R_0 \times Gm_{pass} \times R_{OUT}}{1 + \beta \times Gm_0 \times R_0 \times Gm_{pass} \times R_{OUT}} \right\} \times V_{REF}$$

where $Gm_0$ and $R_0$ are the transconductance and output impedance of $A_0$ respectively, $Gm_{pass}$ is the transconductance of series-pass device, $R_{OUT}$ is impedance of output load and $\beta$ is the scaling factor of feedback network.

8. The linear regulator of claim 1 wherein $I_{OUT}$ is regulated to be approximately $$I_{OUT} = \left\{ \frac{Z_1 \times Gm_1 \times R_0 \times Gm_{pass} \times R_{OUT}}{1 + M \times Z_1 \times Gm_1 \times R_0 \times Gm_{pass} \times R_{OUT}} \right\} \times I_{REF}$$

where $Z_1$ and $Gm_1$ is the trans-impedance gain and the transconductance gain of CC controller respectively, $R_0$ is output impedance of $A_0$, $Gm_{pass}$ is transconductance of series-pass device and M is the scaling ratio $I_{OUT}$ to $I_{SEN}$.

9. A linear regulator which implements a constant voltage to constant current (CV-CC) transition and a constant current to constant voltage (CC-CV) transition comprises:

an amplifier $A_0$ having a first and second input and an output, said first input connects to feedback voltage ($V_{FB}$), said second input connects to reference voltage ($V_{REF}$), said amplifier $A_0$ having a pseudo-constant bias (PCB) which automatically biases and controls transconductance of amplifier $A_0$ as function of operating mode and having an adaptive compensation network (ACN) which adaptively alters speed and stability for current regulation;

a buffer connected to the amplifier $A_0$ output and having a buffer output;

a series-pass device connected to said buffer output and to second supply voltage ($VDD_2$) and having a first output current ($I_{OUT}$) output and having a second output current ($I_{SEN}$) output, said series-pass device controlling the current from $VDD_2$ to $I_{OUT}$ and $I_{SEN}$; a feedback network having two inputs which senses voltage differential between output voltage ($V_{OUT}$) and ground and generates an output $V_{FB}$ to amplifier $A_0$; and a constant current (CC) controller having a trans-impedence amplifier $Z_1$ and a transconductance device $Gm_1$ and a first input $I_{SEN}$ from the series-pass device and a second input $I_{REF}$ wherein the amplifier $Z_1$ compares $I_{SEN}$ and reference current ($I_{REF}$) and generates voltage control ($V_{SEL}$) as voltage for the signal to ACN for amplifier $A_0$ and device $Gm_1$ generates a current control ($I_{SEL}$) to the PCB.

10. The linear regulator circuit of claim 9, wherein the series-pass device has a current sensor.

11. The linear regulator of claim 10, wherein in the constant voltage (CV) mode $V_{OUT}$ is regulated and $I_{SEN}$ is monitored by amplifier $Z_1$.

12. The linear regulator of claim 10, wherein when $I_{SEN}$ is larger than $I_{REF}$, the regulator undergoes a CV to CC mode transition.

13. The linear regulator circuit of claim 9, wherein the series-pass device comprises a component selected from the group consisting of a p-channel MOSFET, an n-channel MOSFET and a bipolar junction transistor.

14. The linear regulator circuit of claim 9, wherein a constant voltage (CV) feedback loop to amplifier $A_0$ operates in a constant voltage (CV) mode and a CC feedback loop to amplifier $A_0$ operates in a CC mode.

15. The linear regulator circuit of claim 14, further comprising a compensation capacitor $C_C$ disposed in the CV feedback loop and the CC feedback loop and wherein when the regulator is in a CV mode, the compensation capacitor $C_C$ is reduced by ACN to preserve stability and in CC mode, the CC feedback loop dominates and the compensation capacitor $C_C$ is magnified by ACN for frequency compensation.

16. A power management method for managing constant voltage to constant current (CV-CC) and constant current to constant voltage (CC-CV) transition modes in a circuit comprising:

controlling a constant voltage (CV) mode of operation by a first bias to an amplifier to control transconductance $Gm_0$ in the amplifier so that the amplifier has a gain of $Gm_0*R_0$ to amplify the difference between feedback voltage ($V_{FB}$) and reference voltage ($V_{REF}$) wherein a CV feedback loop keeps an output voltage ($V_{OUT}$) to a desired level; and controlling a constant current (CC) mode of operation by a second bias to the amplifier so that for a second transconductance $Gm_1$ the amplifier provides a gain $Gm_1*R_0$ to amplify the difference between second output current ($I_{SEN}$) and reference current ($I_{REF}$) wherein a CC feedback loop provides output current ($I_{OUT}$) at a desired level.

17. The power management method of claim 16 further comprising operating the amplifier in a high gain region in CV and CC modes.

18. The power management method of claim 16 further comprising activating a compensation network to the band width for the CC mode and disabling the compensation network in the CV mode.

19. The power management method of claim 16 further comprising in the CV mode regulating the output voltage ($V_{OUT}$) and amplifying the second output current $I_{SEN}$ by an amplifier $Z_1$ such that when $I_{SEN}>I_{REF}$, the CV mode transitions to a CC mode.

20. The power management method of claim 16 wherein in the CC mode, the regulating the first output current ($I_{OUT}$) and monitoring the $V_{FB}$ so that when $V_{FB}$ ramps up and approaches $V_{REF}$, the CC mode transitions to the CV mode.

* * * * *